(12) United States Patent
Andersson

(10) Patent No.: US 11,533,886 B2
(45) Date of Patent: Dec. 27, 2022

(54) CONNECTOR FOR A TEATCUP TO BE ATTACHED TO THE TEAT OF AN ANIMAL TO BE MILKED, AND A TEATCUP

(71) Applicant: DELAVAL HOLDING AB, Tumba (SE)

(72) Inventor: Anna Andersson, Tumba (SE)

(73) Assignee: DeLaval Holding AB, Tumba (SE)

( * ) Notice: Subject to any disclaimer, the term of this patent is extended or adjusted under 35 U.S.C. 154(b) by 0 days.

(21) Appl. No.: 16/759,033

(22) PCT Filed: Oct. 23, 2018

(86) PCT No.: PCT/SE2018/051081
§ 371 (c)(1),
(2) Date: Apr. 24, 2020

(87) PCT Pub. No.: WO2019/083434
PCT Pub. Date: May 2, 2019

(65) Prior Publication Data
US 2020/0275632 A1    Sep. 3, 2020

(30) Foreign Application Priority Data
Oct. 26, 2017  (SE) ..................... 1751323-5

(51) Int. Cl.
*A01J 5/04*    (2006.01)
*A01J 5/16*    (2006.01)

(52) U.S. Cl.
CPC ............... *A01J 5/044* (2013.01); *A01J 5/16* (2013.01)

(58) Field of Classification Search
CPC ............... A01J 5/044; A01J 5/16; A01J 5/04
USPC ........................................ 119/14.51
See application file for complete search history.

(56) References Cited

U.S. PATENT DOCUMENTS

| 2,484,696 A | 10/1949 | Dinesen |
| 3,818,867 A * | 6/1974 | Strange-Hansen ....... A01J 5/08 119/14.47 |

(Continued)

FOREIGN PATENT DOCUMENTS

| CN | 1187569 A | 7/1998 |
| CN | 1753616 A * | 3/2006 ............... A01J 5/08 |

(Continued)

OTHER PUBLICATIONS

International Search Report and Written Opinion, dated Jan. 25, 2019, from corresponding PCT application No. PCT/SE2018/051081.

(Continued)

*Primary Examiner* — Tien Q Dinh
*Assistant Examiner* — Kevin M Dennis
(74) *Attorney, Agent, or Firm* — Nixon & Vanderhye

(57) ABSTRACT

A connector configured for receiving a cartridge for forming a teatcup where the cartridge includes an elongated sleeve and a barrel pre-mounted in the elongated sleeve and having an inner space for receiving a teat and the connector includes a lower base member and a shell extending from the lower base member and surrounding a receiving space for receiving the cartridge, the lower base member and the shell foringm one piece of a plastic material, and the shell being configured to extend along an axial length of the elongated sleeve at least to the upper end of the sleeve when the cartridge is received in the connector.

16 Claims, 7 Drawing Sheets

(56) References Cited

U.S. PATENT DOCUMENTS

| | | | | |
|---|---|---|---|---|
| 4,459,938 A | * | 7/1984 | Noorlander | A01J 5/08 119/14.49 |
| 4,459,939 A | * | 7/1984 | Noorlander | A01J 5/08 119/14.49 |
| 5,007,378 A | * | 4/1991 | Larson | A01J 5/08 119/14.47 |
| 6,776,120 B1 | * | 8/2004 | Chowdhury | A01J 5/08 119/14.46 |
| 8,210,123 B2 | * | 7/2012 | Duke | A01J 5/08 119/14.49 |
| 10,130,068 B2 | * | 11/2018 | La Torre | A01J 5/16 |
| 10,548,291 B2 | * | 2/2020 | Appelquist | A01J 5/08 |
| 2007/0007653 A1 | | 1/2007 | Chen et al. | |
| 2008/0202433 A1 | * | 8/2008 | Duke | A01J 5/08 119/14.49 |

FOREIGN PATENT DOCUMENTS

| | | |
|---|---|---|
| CN | 2807525 Y | 8/2006 |
| CN | 201459601 U | 5/2010 |
| CN | 102396965 A | 4/2012 |
| CN | 202646505 U | 1/2013 |
| CN | 203189928 U | 9/2013 |
| CN | 106793764 A | 5/2017 |
| JP | 2003-517316 A | 5/2003 |
| WO | 01/45498 A1 | 6/2001 |
| WO | 2007/031783 A1 | 3/2007 |
| WO | 2014/178783 A1 | 11/2014 |
| WO | 2016/099384 A1 | 6/2016 |

OTHER PUBLICATIONS

SE Search Report and Written Opinion, dated May 9, 2018, from corresponding SE application No. 1751323-5.
Office Action issued in Chinese Patent Application No. 201880069524.2 dated Aug. 25, 2021.
Office Action issued in Chinese Patent Application No. 201880069524.2 dated May 19, 2022.
Office Action issued in Japanese Patent Application No. 2020-520793 dated Aug. 26, 2022.

* cited by examiner

Fig 1
Fig 2
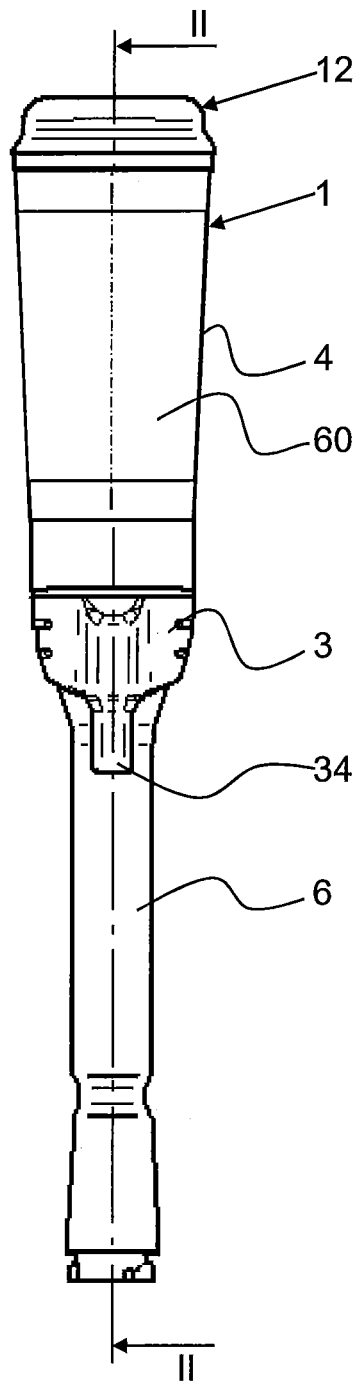
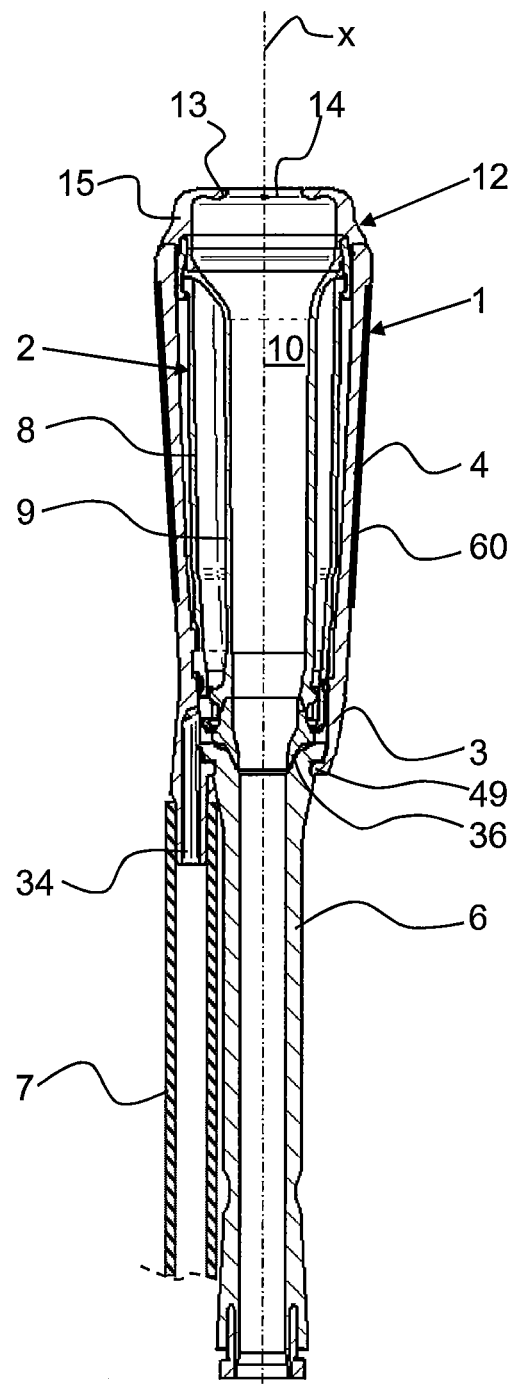

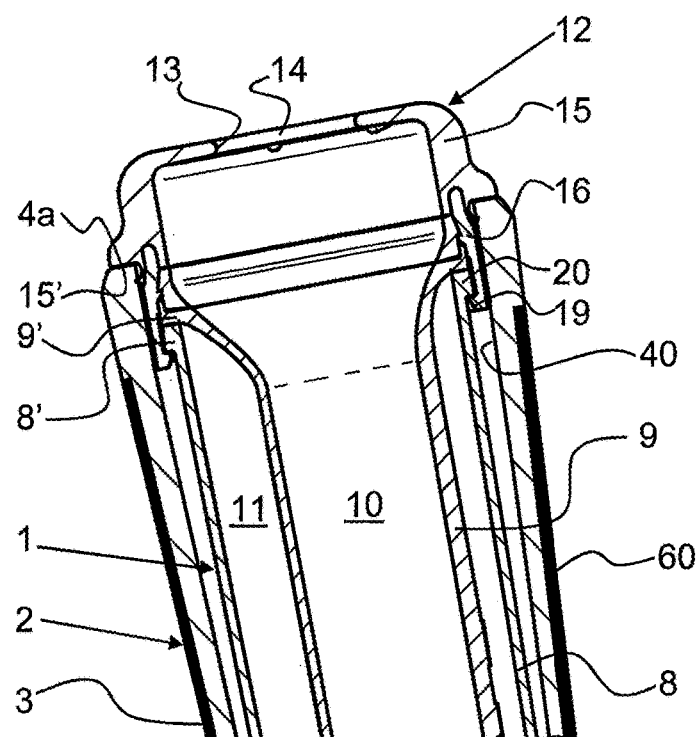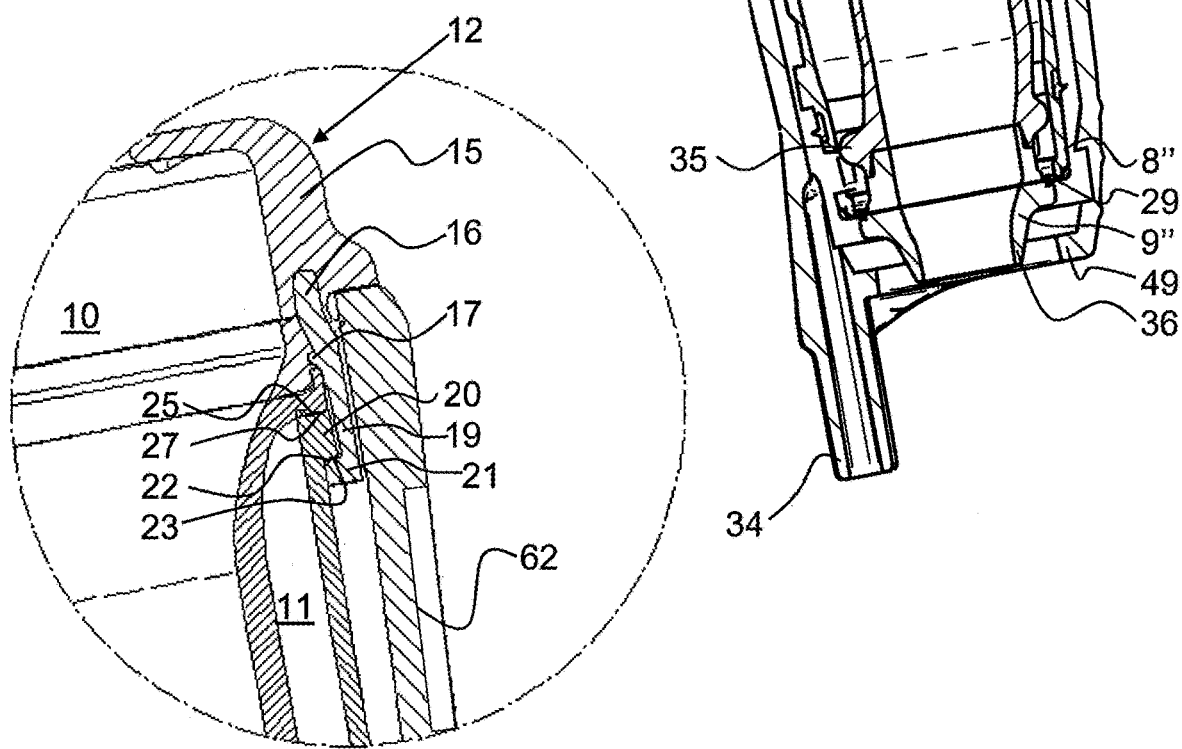

CONNECTOR FOR A TEATCUP TO BE ATTACHED TO THE TEAT OF AN ANIMAL TO BE MILKED, AND A TEATCUP

TECHNICAL FIELD OF THE INVENTION

The present invention refers generally to a connector configured to receive a cartridge for forming a teatcup to be attached to the teat of an animal to be milked. More precisely, the present invention refers to a connector according to the preamble of claim 1.

The present invention also refers to a teatcup configured to be attached to the teat of an animal to be milked.

BACKGROUND AND PRIOR ART

WO 2014/178783 discloses a connector for a teatcup to be attached to the teat of an animal to be milked. The connector is configured to receive a cartridge comprising an elongated sleeve and a barrel, which is pre-mounted in the elongated sleeve and has an inner space for receiving the teat. The elongated sleeve has axial length from a lower end of the sleeve to an upper end of the sleeve. The connector comprises a lower base member and a shell extending from the lower base member and surrounding a receiving space for receiving the cartridge.

The cartridge is a disposable product and could therefore preferably be made of less expensive and less exclusive materials. Furthermore, the wall thickness of the elongated sleeve could be as designed to be thin as possible.

The shell of the prior art connector does not offer an optimum protection of the cartridge, in particular since the shell ends below an upper end of the elongated sleeve of the cartridge.

Furthermore, the manufacturing of the prior art connector requires an attachment step for attaching the shell to the lower base member. Measures have to be taken in order to obtain a secure attachment of the shell.

SUMMARY OF THE INVENTION

The object of the present invention provide an improved protection of a cartridge received in a connector of a teatcup.

This object is achieved by the connector initially defined, which is characterized in that the lower base member and the shell form one piece of a plastic material and that the shell is configured to extend outside the elongated sleeve along the axial length of the elongated sleeve at least to the upper end of the sleeve when the cartridge is received in the receiving space of the connector.

The shell of the connector may offer a proper protection of the disposable cartridge. Since the shell extends at least to, i.e. to or beyond, the upper end of the sleeve, a complete covering of the elongated sleeve of the cartridge along its whole length in the receiving space inside the shell. Since the shell is manufactured, for instance molded, as one single piece, no subsequent assembling step is required.

According to an embodiment of the invention, the connector comprises a metal sleeve attached to and extending around an outer surface of the shell. Such a metal sleeve may offer further strength and rigidity to the shell of the connector, thus enhancing the protection of the cartridge. In addition, the metal sleeve may increase the weight of the teatcup, which is believed to improve the milking efficiency, since the teatcup may then hang more vertically downwardly and exert a higher downward force on the teat.

According to an embodiment of the invention, the metal sleeve consists of stainless steel. Stainless steel is resistant against the quite aggressive environment of a milking parlor. The metal sleeve may also consist of other suitable metals or metal alloys.

According to an embodiment of the invention, the outer surface comprises a depressed surface portion extending around the shell, wherein the metal sleeve is arranged in the depressed surface portion. The depressed surface portion may offer a secure attachment of the metal sleeve to the shell.

According to an embodiment of the invention, the metal sleeve has an outer surface which transitions continuously to the outer surface of the shell at least at a lower end of the metal sleeve, and possibly also at an upper end of the metal sleeve. There may thus be a smooth transition from the outer surface of the shell to the outer surface of the metal sleeve.

According to an embodiment of the invention, the shell is tapering and the metal sleeve is correspondingly tapering, wherein the shell is configured to permit the metal sleeve to be pushed onto the shell and into the depressed surface portion of the shell.

The metal sleeve may thus be pushed onto the shell, preferably in a direction from the lower base member, upwards to the depressed surface portion, at which the metal sleeve may snap into the depressed surface portion.

According to an embodiment of the invention, the shell is tapering from an upper end of the shell. Also the metal sleeve may be tapering from an upper end of the metal sleeve, as well as the depressed surface portion. Advantageously, the metal sleeve and the depressed surface portion may have a shape of a truncated cone, and may have equal cone angles in relation to the longitudinal central axis.

According to an embodiment of the invention, the connector comprises a pulse nipple, which extends downwardly from the lower base member in parallel with the longitudinal central axis in a manner to permit the lower base member and the pulse nipple to pass through the metal sleeve when it is pushed onto the shell.

Advantageously, the shell has a maximum diameter of at the upper end that is longer than a maximum diameter of the lower base member including the pulse nipple.

According to an embodiment of the invention, the metal sleeve has an upper end located at an axial distance from an upper end of the shell. The axial distance from the upper end of the shell may be at least 3 mm.

According to an embodiment of the invention, the metal sleeve has a lower end located at an axial distance from the lower base member. The axial distance from the lower base member may be at least 20 mm.

According to an embodiment of the invention, the metal sleeve has an axial length that is at least 20 mm, at least 30 mm, at least 40 mm, at least 50 mm, at least 60 mm, at least 70 mm or at least 80 mm. The axial length of the metal sleeve extends from a lower end of the metal sleeve to an upper end of the metal sleeve.

According to an embodiment of the invention, the shell has an engagement element and the metal sleeve has a corresponding engagement element, which engage each other to prevent the metal sleeve from rotate in relation to the shell.

According to an embodiment of the invention, the engagement element comprises a projection extending into the depressed surface portion. The corresponding engagement element may comprise a notch configured to receive the projection and extending from one of the upper and lower ends of the metal sleeve.

According to an embodiment of the invention, the cartridge comprises a head member comprising a lip surrounding an opening to the inner space, wherein the shell comprises an upper end surface configured to seal against a lower surface of the head member. The sealing between the upper end surface of the shell and the lower surface of the head member may prevent dirt and aggressive substances from reaching the receiving space of the connector.

According to an embodiment of the invention, the plastic material of the lower base member and the shell is a polybutylene terephthalate resin (PBT). For instance, the PBT resin may be Crastin® from DuPont™, which is available in a plurality of grades for various industrial applications.

The object is also achieved by the teatcup initially defined, which comprises a cartridge and a connector according to any one of the embodiments defined above.

BRIEF DESCRIPTION OF THE DRAWINGS

The present invention is now to be explained more closely through a description of various embodiments and with reference to the drawings attached hereto.

FIG. 1 discloses a side view of a teatcup a connector according to a first embodiment of the invention.

FIG. 2 discloses a longitudinal sectional view of the teatcup along the line II-II in FIG. 1.

FIG. 3 discloses a longitudinal sectional view of the teatcup in FIG. 1 disconnected from milk and pulse conduits.

FIG. 4 discloses a longitudinal sectional view of an upper part of the teatcup in FIG. 1.

DETAILED DESCRIPTION OF VARIOUS EMBODIMENTS

Figure 5:
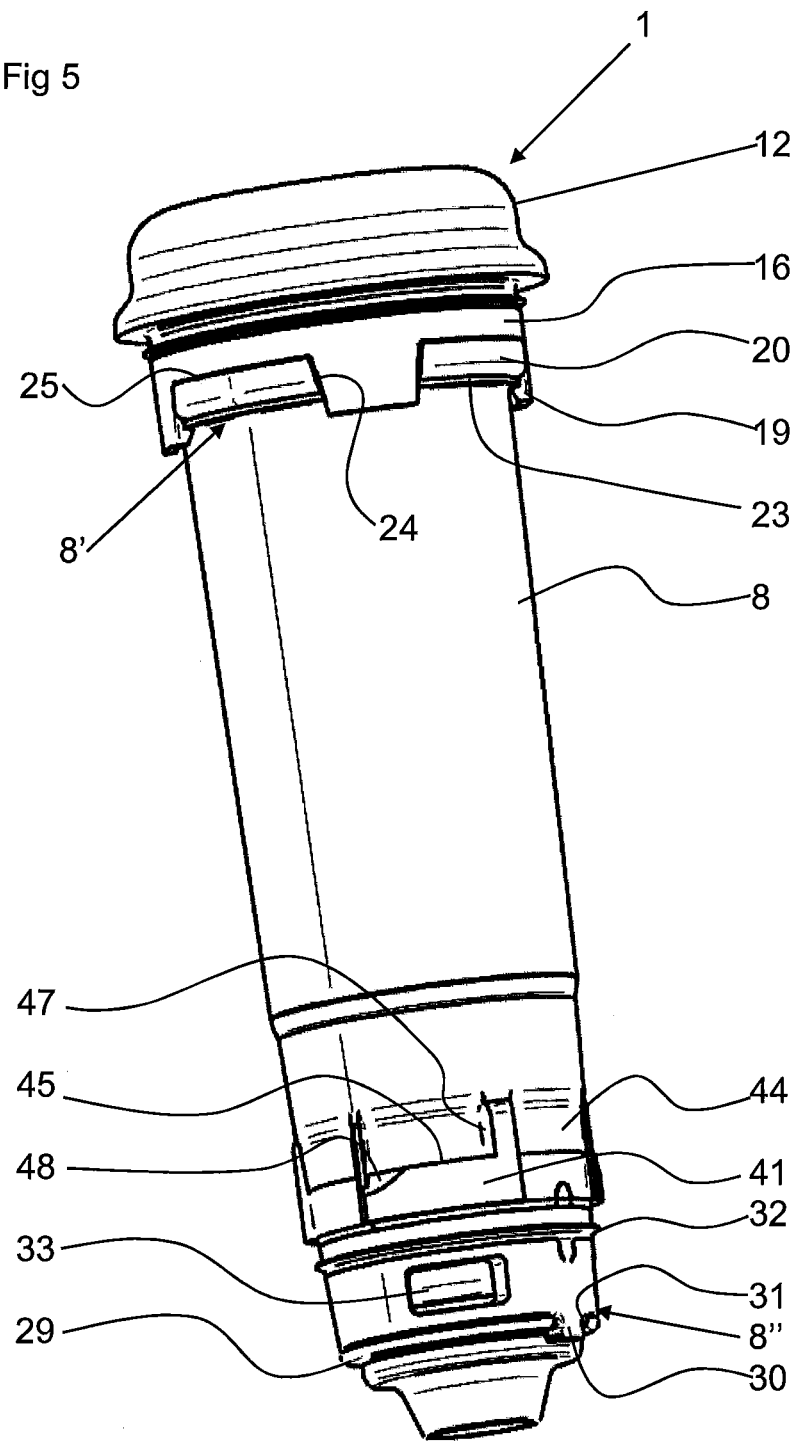
FIG. 5 discloses a perspective view of a cartridge of the teatcup in FIG. 1.

FIGS. 1 to 4 disclose a teatcup to be attached to the teat of an animal to be milked. The teatcup comprises a cartridge 1, see also FIG. 5, and a connector 2, see also FIG. 6.

The connector 2 comprises a lower base member 3 and a shell 4. The shell 4 extends from the lower base member 3 and surrounds a receiving space 5 of the connector 2. When the teatcup is assembled, the cartridge 1 is received in the receiving space 5 of the connector as can be seen in FIGS. 2 and 3.

In the embodiments disclosed, the lower base member 3 and the shell 4 form one integrated part, and are manufactured in one piece of a plastic material. The connector 2, i.e. the lower base member 3 and the shell 4, may be molded by any suitable molding method. The plastic material of the lower base member 3 and the shell 4 may be a polybutylene terephthalate resin, PBT, for instance be Crastin® from DuPont™, which is available in a plurality of grades for various industrial applications.

The shell 4 has an upper end 4' and a lower end 4". The lower end 4" adjoins the lower base member 3. The shell 4 is tapering from the upper end 4' to the lower end 4".

Figure 7:
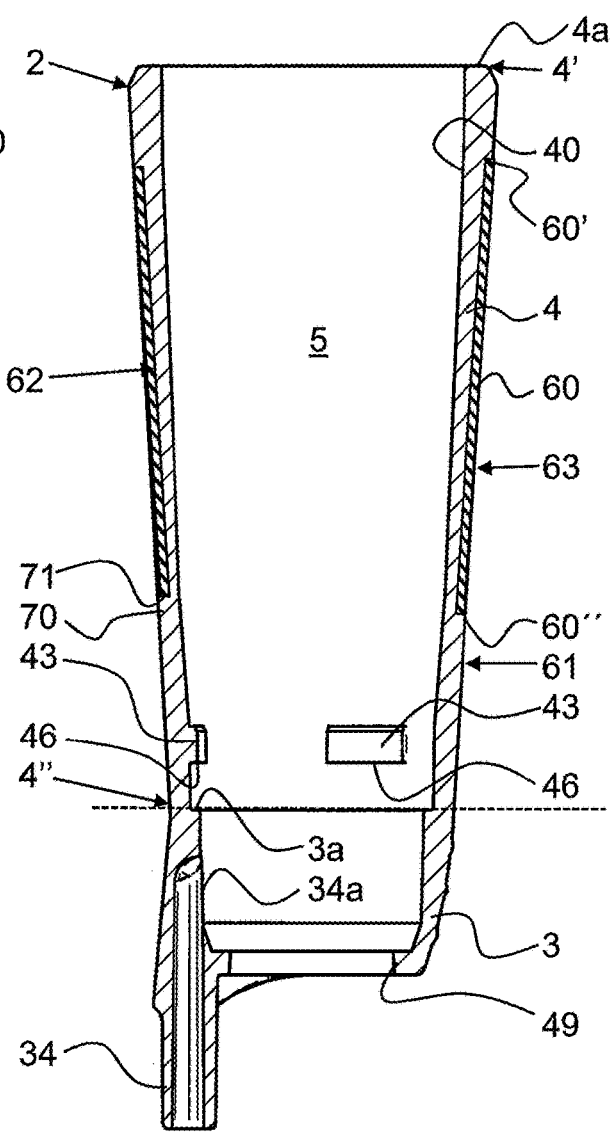
FIG. 7 discloses a longitudinal sectional view along the line VII-VII in FIG. 6.

As can be seen in FIG. 7, the lower end 4" adjoins the lower base member 3 at an inward shoulder 3a of the lower base member 3.

The transition from the lower base member 3 to the shell 4 is indicated by a dotted line in FIG. 7.

The teatcup may comprise or be connected to a milk conduit 6, such as a short milk conduit or a long milk conduit, and to a pulse conduit 7.

A longitudinal central axis x extends through and along the teatcup, i.e. through the cartridge 1 and the connector 2. The longitudinal central axis x may also extend through and along at least a part of the milk conduit 6 when it is in a rest state as indicated in FIG. 2.

Throughout the application, the word "upper" indicates a position closer to the udder of the animal during the milking when the teatcup is attached to the teat of an animal in comparison to the word "lower" that indicates a position more remote from the udder during the milking of the animal. The word "axial" is used to mean in parallel with the longitudinal central axis x.

The cartridge 1 comprises an elongated sleeve 8 and a barrel 9. The elongated sleeve 8 extends in parallel with the longitudinal central axis x and has an upper end 8' and a lower end 8". The barrel 9 is pre-mounted in the elongated sleeve 8 and has an inner space 10 for receiving the teat. A pulsation chamber 11 is formed and enclosed between an inner surface of the elongated sleeve 8 and an outer surface of the barrel 9.

The cartridge 1 also comprises a head member 12, which comprises a lip 13 surrounding and defining an opening 14 to the inner space 10 for the introduction of the teat into the inner space 10.

The head member 12 is provided at the upper end 8' of the elongated sleeve 8, and is attached to the barrel 9.

The head member 12 comprises a lip element 15 comprising the lip 13 and a ring member 16 attached to the lip element 15 and comprising an engagement element 17, see FIG. 4. The engagement element 17 attaches the head member 12 to the barrel 9. The engagement element 17 is configured as an annular protrusion extending inwardly into a groove in the barrel 9 as can be seen in FIG. 4. The groove may be annular extending around an outer surface of the barrel 9.

The lip element 15 is made of a relatively elastic material, whereas the ring member 16 is made of a relatively rigid material.

The head member 12 comprises a plurality of locking members 19, in the embodiments disclosed four locking members 19. The locking members 19 are separated from each other, preferably equidistantly separated from each other, and are thus uniformly distributed along the periphery of the head member 12.

The locking members 19 are comprised by the ring member 16 and extends towards the lower end 8" outside the barrel 9 as can be seen in FIG. 4.

The elongated sleeve 8 has an annular flange 20 extending outwardly at the upper end 8' of the elongated sleeve 8. Each of the locking members 19 is gripping the annular flange 20, and extends beyond the annular flange 20.

Each of the locking members 19 comprises an inwardly extending portion 21 which comprises an engagement surface 22 turned away from the lower end 8". Each of the locking members 19 may comprise or be configured as a hook, see FIGS. 3 and 4.

The annular flange 20 comprises a lower surface 23 turned towards the lower end 8".

Each of the engagement surfaces 22 abuts the lower surface 23 when the locking members 19 of the head member 12 are gripping the annular flange 20. The lower surface 23 may comprise a plurality of surface portions, wherein each of the engagement surfaces 22 abuts a respective one of the surface portions. The surface portions may lie in the same plane, for instance the same radial plane, as the lower surface 23, or may be axially displaced with respect to the lower surface 23.

Figure 8:
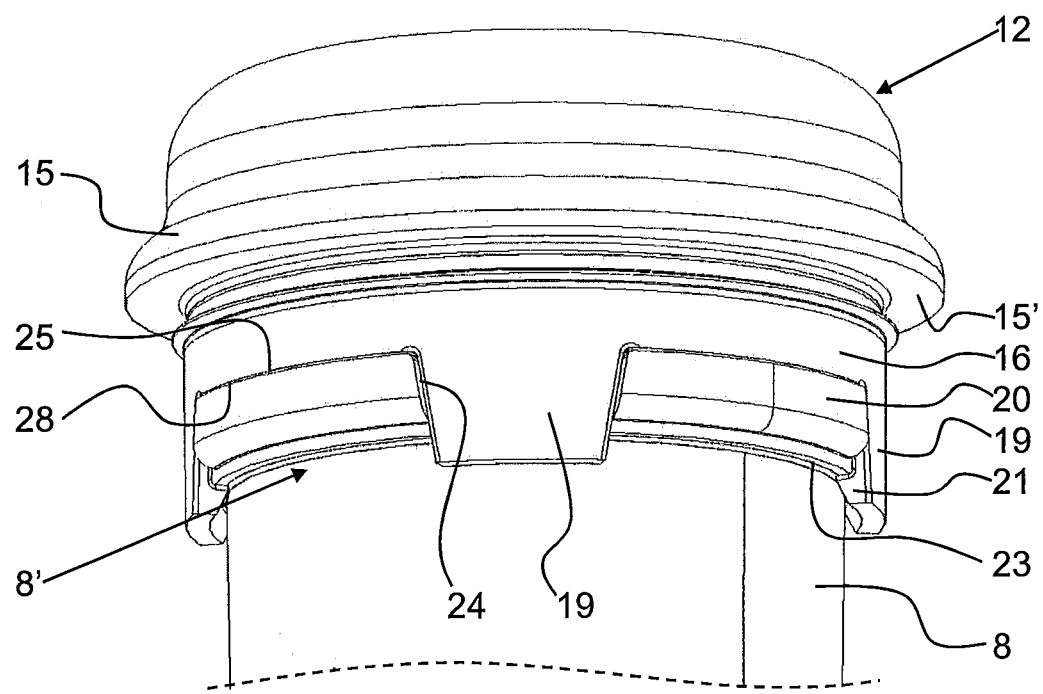
FIG. 8 discloses a perspective view of an upper part of the cartridge in FIG. 4.

The annular flange 20 comprises a plurality of recesses 24, in the embodiments disclosed four recesses 24, see FIGS. 5 and 8. The recesses 24 are separated from each other, preferably equidistantly separated from each other, may and thus be uniformly distributed along the periphery of the annular flange 20.

The annular flange 20 has an upper surface 25 facing away from the lower end 8". The upper surface 25 may be opposite to the lower surface 23 of the annular flange 20. The upper surface 25 may extend in parallel with, or substantially in parallel with, a radial plane with regard to the longitudinal central axis x.

Each of the recesses 24 extends through the upper surface 25 and in parallel with the longitudinal central axis x. Each of the locking members 19 is received in a respective one of the recesses 24.

Each of the recesses 24 has a tapering shape towards the lower end 8' when seen in a radial direction with regard to the longitudinal central axis x, and each of the locking members 19 has a corresponding tapering shape towards the lower end 8" when seen in a radial direction with regard to the longitudinal central axis x, see FIGS. 5 and 8. The tapering shape of the recesses 24 and the locking members 19 facilitates introduction of the locking members 19 into the recesses 24, and contributes to a firm engagement of each of the locking members 19 in the respective recess 24.

The barrel 9 comprises an upper end portion 9' located at the upper end 8' of the elongated sleeve 8, a lower end portion 9" located at the lower end 8" of the elongated sleeve 8, and a barrel portion 9''' extending between the upper end portion 9' and the lower end portion 9", see FIG. 3.

The barrel portion 9''' is made of a relatively elastic material, whereas the upper end portion 9' and the lower end portion 9" are made of a relatively rigid material.

The upper end portion 9' of the barrel 9 has an abutment surface 27 extending outwardly and turned towards the lower end portion 9" and the lower end 8", see FIG. 4. Also the ring member 16 has an abutment surface 28 turned towards the lower end 8" and lying in a common plane with the abutment surface 27 of the upper end portion 9' of the barrel 9, see FIG. 8. The abutment surface 27 of upper end portion 9' and the abutment surface 28 of the ring member 16 abut the upper surface 25 of the annular flange 20, as can be seen in FIGS. 4 and 8.

In the embodiments disclosed, the barrel portion 9''' has, in a rest state, a triangular cross-sectional shape defining three corner portions and three side portions, as is indicated in FIG. 2. Each side portion is straightened and extends between and connects two of the three corner portion. It should be noted that the barrel portion 9''' also may have any other suitable polygonal cross-sectional shape or a circular cross-sectional shape.

The lower end portion 9" of the barrel 9 comprises a stop flange 29 extending outwardly, see FIGS. 3 and 5. The stop flange 29 abuts an end surface of the lower end 8" of the elongated sleeve 8, and maintains the axial position of the lower end portion 9" in relation to the elongated sleeve 8.

A protrusion 30 extends downwardly from the end surface of the lower end 8" of the elongated sleeve 8. The protrusion 30 may have a dovetail shape, as can be seen in FIG. 5. The protrusion 30 fits into a recess 31 in the annular flange 29 when the barrel 9 is mounted in the elongated sleeve 8 to prevent the barrel 9 from being rotated and twisted around the longitudinal central axis x in relation to the elongated sleeve 8. The protrusion 30 and the recess 31 may thus define the rotary position of the barrel 9 in the elongated sleeve 8. It should be noted that more than one protrusion 30 and recess 31 may be provided.

The elongated sleeve 8 comprises a sealing ring 32 extending around an outer surface 42 of the elongated sleeve 8.

Figure 9:
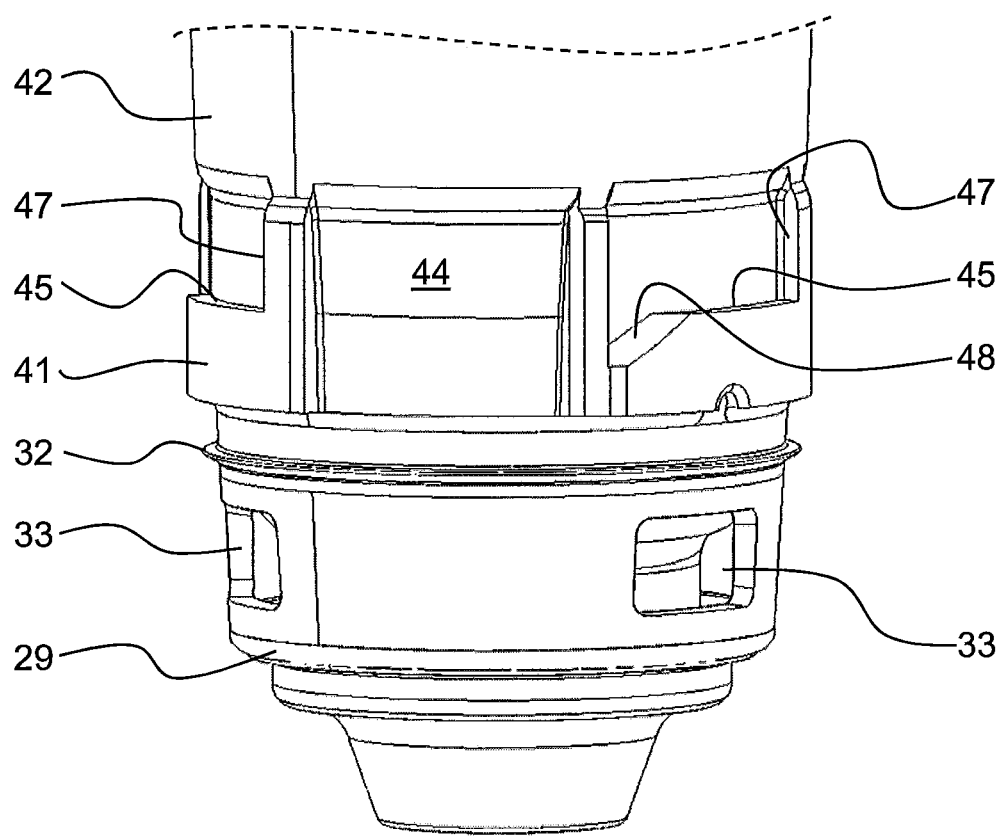
FIG. 9 discloses a perspective view of a lower part of the cartridge in FIG. 4.
Figure 10:
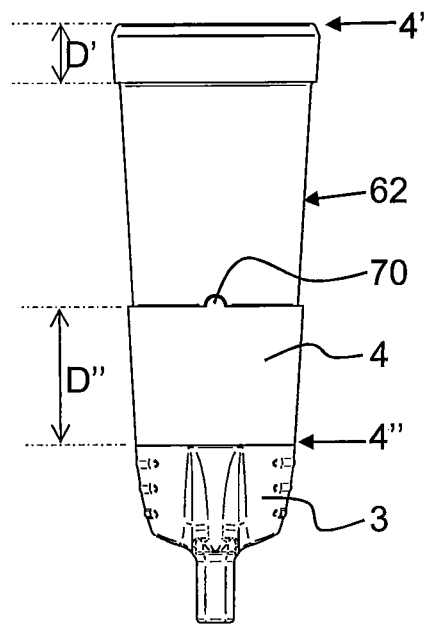
FIG. 10 discloses a side view of the connector in FIG. 6 without metal sleeve.
Figure 11:
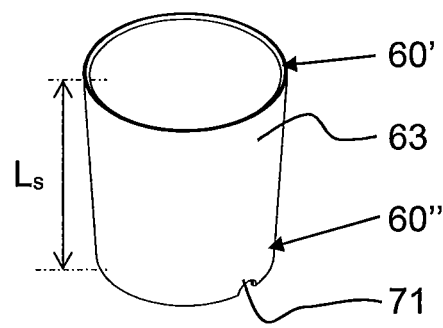
FIG. 11 discloses a perspective view of the metal sleeve of the connector in FIG. 6.

In the embodiment disclosed, the elongated sleeve 8 comprises three openings 33, see FIGS. 3 and 9, at the lower end 8". The openings 33 are provided between the sealing ring 32 and the end surface of the lower end 8".

The openings 33 are distributed, preferably equidistantly distributed, around the lower end 8" of the elongated sleeve 8. Each of the openings 33 permits passage of a pulsating pressure into and out from the pulsation chamber 11 via a pulse nipple 34 and the pulse conduit 7.

The pulse nipple 34 extends downwardly from the side of the lower base member 3. The pulse nipple 34 permits supply of the pulsating pressure to the pulsation chamber 11 via a pulse opening 34a through the lower base member 3 and the openings 33.

The pulse nipple 34 extends beside and in parallel with the longitudinal central axis x.

The sealing ring 32 abuts the inward shoulder 3a when the cartridge 1 is received in the receiving space 5 of the connector 2 and prevents the pulsating pressure from reaching the receiving space 5 between the shell 4 and the cartridge 1.

Although the number of openings 33 could be another than three, it is preferable if the number of openings 33 is the same as the number of side portions of the barrel portion 9''' of the barrel 9.

The barrel portion 9''' comprises a protruding ring 35 projecting outwardly and extending around the barrel portion 9''' in the proximity of the lower end portion 9". The protruding ring 35 comprises three straightened portions, which each is axially, or substantially axially, aligned with a respective one of the side portions of the barrel portion 9'''. The protruding ring 35 thus has a polygonal shape corresponding to the polygonal shape of the barrel portion 9''' above the protruding ring 35. Each of the straightened portion of the protruding ring 35 is located partly opposite to a respective one of the openings 33. Furthermore, the barrel 9, in particular the lower end portion 9", comprises or forms a milk outlet nozzle 36.

When the cartridge 1 is received in the connector 2, the shell 4 extends to and beyond the upper end 8' of the elongated sleeve 8, as can be seen in FIG. 3. The lower end 8″ of the elongated sleeve 8 extends into the lower base member 3. The elongated sleeve 8 is thus protected by the shell 4 and the lower base member 3.

Furthermore, the locking members 19 are located inside and adjacent to an inner surface 40 of the shell 4 when the cartridge 1 is received in the receiving space 5 of the connector 2. The shell 4 will thus prevent the locking members 19 from moving outwardly and thus from leaving the engagement of the annular flange 20.

When the cartridge 1 is received in the receiving space 5 of the connector 2, only the lip element 15 of the head member 12 extends above and beyond the upper end 4′ of the shell 4.

The head member 12 has a lower surface 15″, which may be comprised by the lip element 15 and which abuts an upper end surface 4a at the upper end 4′ of the shell 4 when the cartridge 1 is received in the connector 2. The abutment of the lower surface 15″ against the upper end surface 4a contributes to seal the receiving space 5 from the environment.

A plurality of coupling members 41 are provided on the outer surface 42 of the elongated sleeve 8, see FIG. 9, and a plurality of complementary coupling members 43 are provided on the inner surface 40 of the shell 4 of the connector 2, see FIG. 7. Each of the coupling members 41 form a bayonet coupling with a respective one of the complementary locking members 43 to permit locking of the cartridge 1 in the connector 2.

A passage 44 is provided between each of the coupling members 41 to permit a respective on of the complementary coupling members 43 to pass when the cartridge 1 is introduced into the receiving space 5 of the connector 2 along a direction parallel with the longitudinal central axis x. The cartridge 1 may thus be introduced into the connector 2 along said direction until the coupling member 1 has passed beyond the complementary coupling member 43 to a final axial position.

Each of the coupling members 41 comprises an upper surface 45 turned away from the lower end 8″ to permit engagement by the complementary coupling member 43. When the cartridge 1 has reach the final axial position along said direction, it may be rotated in relation to the connector 2, wherein the upper surface 45 of each coupling members 41 may slide on a lower surface 46 of a respective one of the complementary coupling members 43.

In the embodiments disclosed, each of the coupling members 41 comprises a stop surface 47 extending from the upper surface 45 and being parallel with the longitudinal central axis x. The stop surface 47 provides or defines the final rotary position of the cartridge 1 after the rotation of the cartridge 1 around the longitudinal central axis x in relation to the connector 2.

Furthermore, each of the coupling members 41 comprises a sloping ramp 48 extending to the upper surface 45 to permit sliding of the complementary coupling member 43 onto the upper surface 45. The sloping ramp 48 may facilitate for the upper surface 45 of the cartridge 1 to reach the lower surface 46 of the connector 1, and thus the sloping ramp 48 may facilitate the initial part of said rotation of the cartridge 1 in relation to the connector 2.

The connector 2 comprises a bottom flange 49 extending inwardly towards the longitudinal central axis x, especially radially inwardly. The flange 49 may engage a corresponding groove in an upper portion of the milk conduit 6 in order to releasably attach the connector 2 to the milk conduit 6 as can be seen in FIG. 2.

Figure 6:
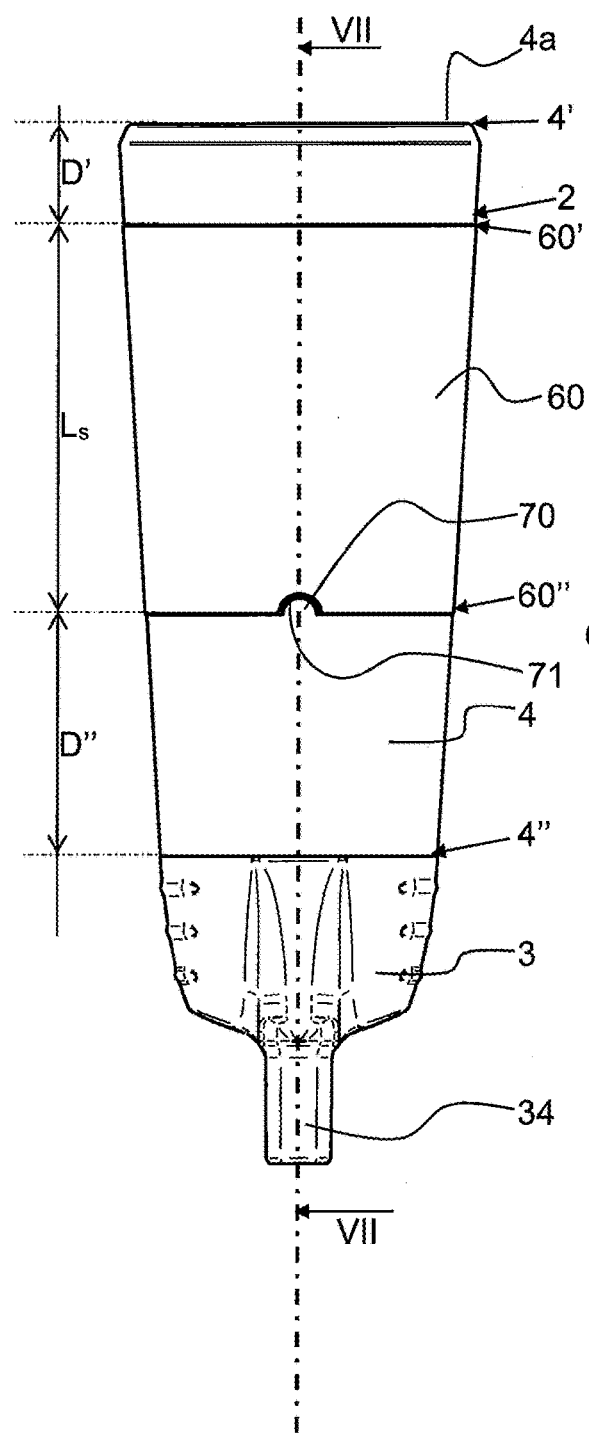
FIG. 6 discloses a side view of the connector according to a second embodiment of the invention.

In the first embodiment disclosed in FIGS. 6, 7, 10 and 11, the connector 2 comprises a metal sleeve 60. The metal sleeve 60 is attached to and extends around an outer surface 61 of the shell 4 as can be seen in FIGS. 6 and 7. The metal sleeve 60 may consist of stainless steel or any other suitable metal or metal alloy. The metal sleeve 60 has an upper end 60′ and a lower end 60″.

The outer surface 61 of the shell 4 comprises a depressed surface portion 62 extending around the shell 4. The metal sleeve 60 is arranged in the depressed surface portion 62. The metal sleeve 60 has an outer surface 63, which transitions continuously to the outer surface 61 of the shell 4 at the lower end 60″ of the metal sleeve 60 and at the upper end 60′ of the metal sleeve 60. There is thus a smooth transition from the outer surface 61 of the shell 4 to the outer surface 63 of the metal sleeve 60.

The metal sleeve 60 is tapering from the upper end 60′ of to the lower end 60″ of the metal sleeve 60 in the same manner as the shell 4. The metal sleeve 60 may be pushed onto the shell 4 and into the depressed surface portion 62 of the shell 4 thanks to the tapering shape of the shell 4 and the axial extension of the pulse nipple 34 extending from the side of the lower base member 3 axially downwardly in parallel with the longitudinal central axis x. The metal sleeve 60 may thus be pushed onto the shell 4 in a direction upwards over the lower base member 3 and the pulse nipple 34 to the depressed surface portion 62, at which the metal sleeve 60 may snap into the depressed surface portion 62.

Thus, both the metal sleeve 60 and the depressed surface portion 62 may have a shape of a truncated cone, and preferably equal cone angles in relation to the longitudinal central axis x.

The shell 4 has a maximum diameter at the upper end 4′ that may be longer than a maximum diameter of the lower base member 3 including the pulse nipple 34. Moreover, the maximum diameter of the lower base member 3 including the pulse nipple 34 may be shorter than a minimum inner diameter of the metal sleeve 60 in order to ensure that the lower base member 3 and the pulse nipple 34 to pass through the metal sleeve 60 when it is pushed onto the shell 4.

The upper end 60′ of the metal sleeve 60 is located at an axial distance D′ from the upper end 4′ of the shell 4. The axial distance D′ may be at least 3 mm, at least 5 mm or at least 10 mm.

The lower end 4″ of the metal sleeve 60 is located at an axial distance D″ from the lower base member 3, i.e. from the inward shoulder 3a. The axial distance D″ is at least 20 mm, at least 30 mm or at least 40 mm.

The metal sleeve 60 has an axial length $L_s$ that is at least 20 mm, at least 30 mm, at least 40 mm, at least 50 mm, at least 60 mm or at least 70 mm.

The shell 4 has an engagement element 70 and the metal sleeve has a corresponding engagement element 71. The two engagement elements 70, 71 engage each other to prevent the metal sleeve 60 from rotate in relation to the shell 4. The engagement element 70 comprises a projection extending into the depressed surface portion 62. The engagement element 70 may extend towards one of the upper end 4′ and the lower end 4″. The corresponding engagement element 71 may comprise a notch configured to receive the projection. In order to permit engagement with the engagement element 70, the corresponding engagement element 71 may extend from one of the upper end 60′ and the lower end 60″ of the metal sleeve 60.

Figure 12:
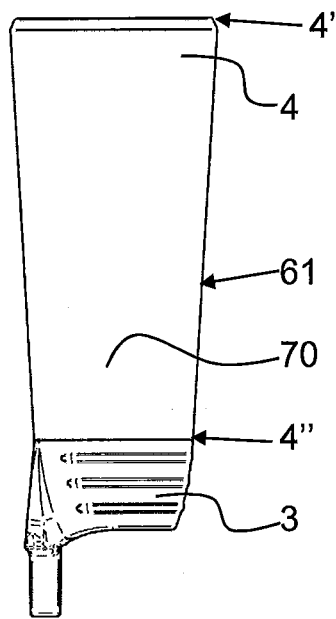
FIG. 12 discloses a side view of the connector according to a second embodiment.
Figure 13:
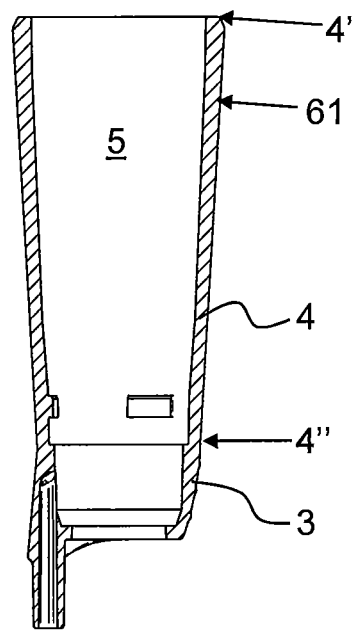
FIG. 13 discloses a longitudinal sectional through the connector in FIG. 12.

FIGS. 12 and 13 disclose a second embodiment, which differs from the first embodiment in that no metal sleeve 60 is provided. Thus, the connector 2 consists of the lower base member 3 and the shell 4, having a continuous outer surface 61.

Figure 14:
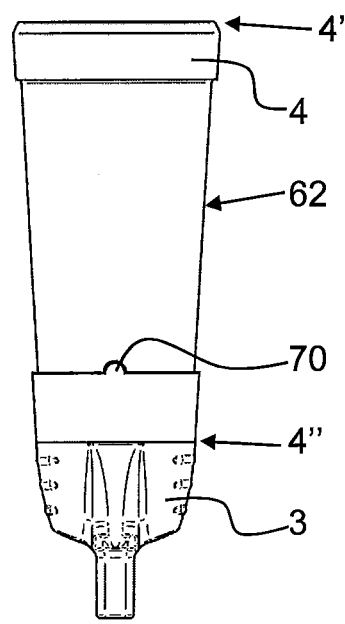
FIG. 14 discloses a side view of the connector according to a third embodiment without metal sleeve.

FIG. 14 discloses a third embodiment, which differs from the first embodiment in that the depressed surface portion 62 of the connector 2 has a longer axial length. The depressed surface portion 62 of the third embodiment is thus adapted to receive a metal sleeve 60 having a longer axial length $L_s$.

Figure 15:
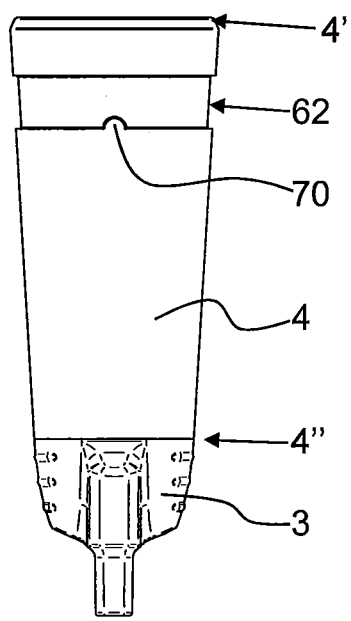
FIG. 15 discloses a side view of the connector according to a forth embodiment without metal sleeve.
Figure 16:
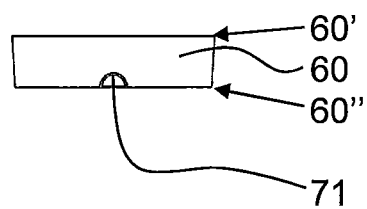
FIG. 16 discloses a side view of a metal sleeve for the connector in FIG. 15.

FIGS. 15 and 16 disclose a fourth embodiment, which differs from the first embodiment in that the depressed surface portion 62 of the connector 2 has a shorter axial length. The depressed surface portion 62 of the fourth embodiment is thus adapted to receive the metal sleeve 60 that is disclosed in FIG. 16 and that has a shorter axial length $L_s$.

The cartridge 1 is assembled by attaching the head member 12 to the barrel 9, wherein the engagement element 17 engages the groove on the outer side of the barrel 9. The barrel 9, with the head member 12 attached thereto, is then mounted in the elongated sleeve 8, by means of a suitable tool, so that the stop flange 29 is pressed beyond the lower end of the elongated sleeve 8. The stop flange 29 then flexes outwardly to lock the stop flange 29 against the lower end of the elongated sleeve 8, wherein the relative rotary positions of the elongated sleeve 8 and the barrel 9 are adjusted to permit the protrusion 30 to engage the recess 31. At the same time the locking members 19 are introduced into the recesses 24 until the engagement surfaces 22 passes beyond the lower surface 23 of the annular flange 20. The locking members 19 will then flex inwardly to permit the engagement surfaces 22 in order to abut the lower surface 23.

The cartridge 1 may then be mounted in the connector 2 by being introduced along a direction being parallel to the longitudinal central axis x. The cartridge 1 is held in a rotary position so that the complementary coupling members 43 may pass through the passages 44. When the cartridge 1 cannot be moved any further, when the milk outlet nozzle 36 abuts an inner inlet surface of the milk conduit 6, the cartridge 1 is rotated in relation to the connector 2, wherein the lower surface 46 of the complementary coupling members 43 will slide on the sloping ramp 48 and then on the upper surface 45 until the complementary coupling member 43 at a final position reaches the stop surface 47. When the cartridge 1 has reach the final position in the connector 2, the complementary coupling member 43 thus abuts the upper surface 45 and the stop surface 47 of the coupling member 41. The milk outlet nozzle 36 is in this final position pressed against the inner inlet surface of the milk conduit 6 as can be seen in FIG. 2.

The present invention is not limited to the embodiments disclosed and described herein, but may be modified and varied within the scope of the following claims.

It should be noted that the sloping ramp 48 could as an alternative be provided on the complementary coupling member 43 and then extend to the lower surface 46.

Furthermore, the stop surface 47 could as an alternative be provided on and extend downwardly from the lower surface 46 of the complementary coupling member 43.

The stop surface 47 does not have to extend all the way from the upper surface 45 or from the lower surface 46, but may start at a distance from any one of this surfaces 45, 46.

The complementary coupling member 43 has in the embodiments disclosed a rectangular shape seen in a radial direction. It should be noted that the complementary coupling member 43 may instead have other shapes, such as a circular shape.

The invention claimed is:

1. A connector (2) for a teatcup to be attached to a teat of an animal to be milked, the connector (2) comprising:
   a lower base member (3);
   a shell (4) extending along a longitudinal central axis (x) from the lower base member (3);
   a metal sleeve (60) attached to and extending around an outer surface (61) of the shell (4),
   wherein the connector (2) is configured to receive a cartridge (1) comprising an elongated sleeve (8) and a barrel (9) pre-mounted in the elongated sleeve (8) and having an inner space (10) for receiving said teat,
   wherein the elongated sleeve (8) has axial length from a lower end (8") of the elongated sleeve (8) to an upper end (8') of the elongated sleeve (8),
   wherein the shell (4) defines a receiving space (5) for receiving the cartridge (1), the receiving space surrounding the longitudinal central axis (x),
   wherein the lower base member (3) and the shell (4) form one piece of a plastic material,
   wherein the shell (4) is configured to extend outside the elongated sleeve (8) along the axial length of the elongated sleeve (8) at least outside of an endmost part of the upper end (8') of the elongated sleeve (8) when the cartridge (1) is received in the receiving space (5) of the connector (2),
   wherein the outer surface (61) comprises a depressed surface portion (62) extending around the shell (4) and wherein the metal sleeve (60) is arranged in the depressed surface portion (62), and
   wherein the shell (4) is tapering and the metal sleeve (60) is correspondingly tapering, and wherein the shell (4) is configured to permit the metal sleeve (60) to be pushed onto the shell (4) in a direction from the lower base member (3) upwards into the depressed surface portion (62) of the shell (4); and
   a pulse nipple (34) which extends downwardly from the lower base member (3) in parallel with the longitudinal central axis (x) in a manner to permit the lower base member (3) and the pulse nipple (34) to pass through the metal sleeve (60) when the metal sleeve (60) is pushed onto the shell (4) in the direction from the lower base member (3) upwards into the depressed surface portion (62) of the shell (4).

2. The connector (2) according to claim 1, wherein the metal sleeve (60) is made of stainless steel.

3. The connector (2) according to claim 1, wherein the metal sleeve (60) has an outer surface (63) which transitions continuously to the outer surface (62) of the shell (4) at least at a lower end (60") of the metal sleeve (60).

4. The connector according to claim 1, wherein the shell (4) is tapering from an upper end (4') of the shell (4).

5. The connector (2) according to claim 1, wherein the metal sleeve (60) has an upper end (60') located at an axial distance (D') from an upper end of the shell (4).

6. The connector (2) according to claim 1, wherein the metal sleeve (60) has a lower end (60") located at an axial distance (D") from the lower base member (3).

7. The connector (2) according to claim 1, wherein the metal sleeve (60) has an axial length ($L_s$) that is at least 20 mm.

8. The connector (2) according to claim 1, wherein the shell (4) has an engagement element (70) and the metal sleeve (60) has a corresponding engagement element (71), which engage each other to prevent the metal sleeve (60) from rotating in relation to the shell (4).

9. The connector (2) according to claim 1, wherein the cartridge (1) comprises a head member (12) comprising a lip

(13) surrounding an opening (14) to the inner space (10), and wherein the shell (4) comprises an upper end surface (4a) configured to seal against a lower surface (15') of the head member (12).

10. The connector (2) according to claim 1, wherein the plastic material of the lower base member (3) and the shell (4) is a polybutylene terephthalate resin (PBT).

11. A teatcup configured to be attached to the teat of an animal to be milked and comprising the connector (2) according to claim 1 in combination with the cartridge (1), wherein, with the cartridge (1) received in the receiving space (5) of the connector (2), the shell (4) extends outside the elongated sleeve (8) along the axial length of the elongated sleeve (8) at least outside of an endmost part of the upper end (8') of the elongated sleeve (8).

12. The teatcup of claim 11, wherein the lower base member (3) includes a pulse opening (34a) extending through a side of the lower base member (3) the pulse nipple (34) permitting a supply of pulsating pressure to a pulsation chamber (11) of the teatcup via the pulse opening (34a).

13. A teatcup configured to be attached to the teat of an animal to be milked and comprising the connector (2) according to claim 1 in combination with the cartridge (1), wherein, with the cartridge (1) received in the receiving space (5) of the connector (2), the shell (4) extends outside the elongated sleeve (8) along the axial length of the elongated sleeve (8) beyond the endmost part of the upper end (8') of the elongated sleeve (8).

14. A teatcup configured to be attached to the teat of an animal to be milked and comprising the connector (2) according to claim 1 in combination with the cartridge (1), wherein, with the cartridge (1) received in the receiving space (5) of the connector (2), the shell (4) extends outside the elongated sleeve (8) along the axial length of the elongated sleeve (8) beyond the upper end (8') of the elongated sleeve (8) and the lower end (8") of the elongated sleeve (8) extends into the lower base member (3), thereby the elongated sleeve (8) is protected by the shell (4) and the lower base member (3).

15. A teatcup configured to be attached to the teat of an animal to be milked and comprising the connector (2) according to claim 1 in combination with the cartridge (1), wherein the cartridge (1) comprises a head member (12) comprising a lip (13) provided at the upper end (8') of the elongated sleeve (8) and attached to the barrel (9), the lip (13) surrounding and defining an opening (14) to the inner space (10), wherein the cartridge (1) comprises a ring member (16) attaching the lip (13) to the barrel (9) and locking the lip (13) to the sleeve (8), and wherein the shell (4) comprises an upper end surface (4a) sealing against a lower surface (15') of the head member (12), and with the cartridge (1) received in the receiving space (5) of the connector (2), the shell (4) extends at least partially outside along an exterior surface of the ring member (16).

16. The connector (2) according to claim 1, wherein the shell (4) comprises an uppermost end surface (4a) and a lower end (4") that adjoins the lower base member (3), wherein the outer surface (61) of the shell (4) that comprises the depressed surface portion (62) extends around the shell (4) and longitudinally from an upper end (4') of the shell (4), through a longitudinal mid-point of the shell (4), towards the lower end (4") of the shell (4), and wherein the metal sleeve (60) is arranged in the depressed surface portion (62), the metal sleeve (60) having an axial length ($L_s$) that is at least 20 mm extending longitudinally from the upper end (4') of the shell (4), through the longitudinal mid-point of the shell (4), and towards the lower end (4") of the shell (4).

\* \* \* \* \*